United States Patent [19]
Dembosky et al.

[11] Patent Number: 5,813,935
[45] Date of Patent: Sep. 29, 1998

[54] CHAIN GUIDE WITH EXTRUDED WEAR FACE

[75] Inventors: Stanley K. Dembosky, Ithaca; J. Christian Haesloop, Rock Stream; Bradley F. Adams, Homer, all of N.Y.

[73] Assignee: Borg-Warner Automotive, Inc., Sterling Heights, Mich.

[21] Appl. No.: 685,417

[22] Filed: Jul. 23, 1996

[51] Int. Cl.$^6$ ....................................................... F16H 7/08
[52] U.S. Cl. ............................................ 474/111; 474/140
[58] Field of Search ..................................... 474/101, 111, 474/140

[56] References Cited

U.S. PATENT DOCUMENTS

| | | | |
|---|---|---|---|
| 4,826,468 | 5/1989 | Friedrichs | 474/111 X |
| 4,832,664 | 5/1989 | Groger et al. | 474/111 |
| 4,921,472 | 5/1990 | Young | 474/111 |
| 5,045,032 | 9/1991 | Suzuki et al. | 474/140 |

FOREIGN PATENT DOCUMENTS

| | | |
|---|---|---|
| 52-6419 | 2/1977 | Japan . |
| 58-3142 | 1/1983 | Japan . |
| 63-3185 | 1/1988 | Japan . |
| 3-2952 | 1/1991 | Japan . |
| 4-119652 | 10/1992 | Japan . |
| 4-119654 | 10/1992 | Japan . |
| 5-42798 | 6/1993 | Japan . |
| 6-40357 | 10/1994 | Japan . |

*Primary Examiner*—Roger J. Schoeppel
*Attorney, Agent, or Firm*—Sidley & Austin; Greg Dziegielewski

[57] ABSTRACT

A guide rail for power transmission chains consists of a plastic material and is formed by a carrier and a slideway lining body. The slideway lining body is manufactured by an extrusion molding process. The carrier and the slideway lining body having complementary profiles allowing the slide portion to be inserted and locked onto the carrier portion without additional locking mechanisms.

10 Claims, 1 Drawing Sheet

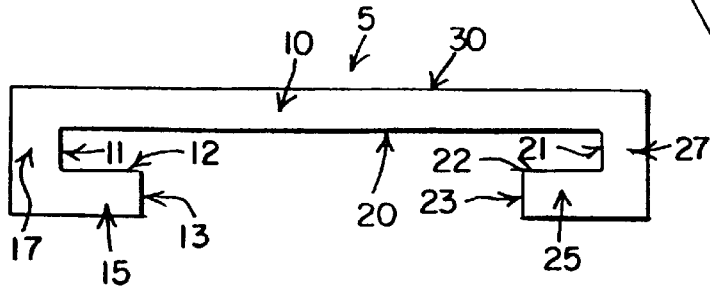
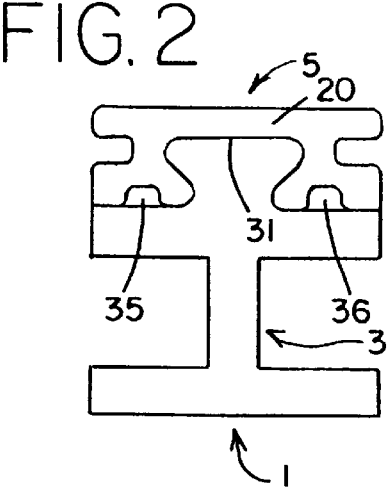
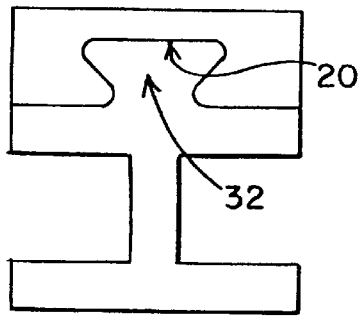
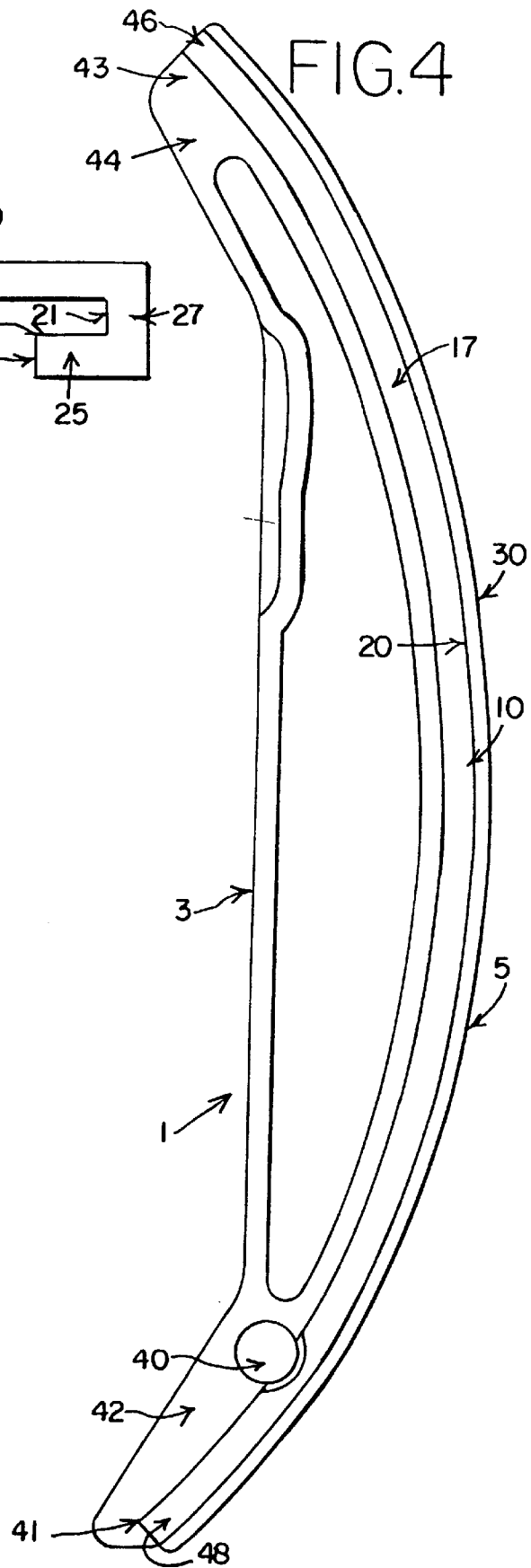

ined description of the invention when considered in
conjunction with the accompanying drawings.

CHAIN GUIDE WITH EXTRUDED WEAR FACE

BACKGROUND OF THE INVENTION

This invention relates to a guide rail or tensioner arm for guiding or tensioning a drive chain and more particularly to a guide rail where the wear face is produced by an extrusion molding process. The guide rails of the preferred embodiment of the present invention are designed for use as chain guides in engine timing chain systems.

Conventional guide rails of the prior art typically include two components that are produced independently of one another and interconnected by some form of locking device. These guide rails are typically formed of plastic.

U.S. Pat. No. 4,832,664 discloses a guide rail that includes a carrier formed of a first plastic material and a slideway lining body made of a second different plastic material. Each of these two components is formed separately in a mold. The carrier and slideway lining body are interconnected to one another by dovetail connections, but secured by bent end sections. In the chain guide shown in U.S. Pat. No. 4,832,664, the carrier and sliding guideway body are formed of complementary dovetail cross-sections, but interlocked by the bent end sections, or a similar meshing arrangement, that prevent relative movement between the two portions.

The guide rails of prior art, such as the guide shown in U.S. Pat. No. 4,832,664, are typically constructed using an injection molding process. The process of injection molding utilizes a mold to form the component. The desired material is placed or injected into the mold and allowed to cure or form. The mold is then removed to reveal the desired component. A limitation on the use of the injection molding process is that undercuts, such as dovetails or grooves, are not readily formed. Undercuts prevent the component from being ejected from the mold. Therefore, the use of clips, hooks, bent end portions or, another type of meshing arrangement, are required to secure the components together. In the alternative to the above-described locking mechanisms, the components must be bonded or welded together.

The present invention relates to a guide rail where the wear face (slideway lining body) is produced by an extrusion molding process. The extrusion molding process is used in place of injection molding to permit the use of dovetail connections and yet provide interlocking components.

The process of extrusion molding produces products that have a substantially constant cross section. The process comprises extruding the core or plastic material by pulling the material through an orifice of a predetermined profile. In contrast to the guides of the prior art, the extrusion method of the present invention provides a slideway with a profile that is substantially complementary to the carrier. The slideway is formed so that it may slide onto the carrier, therefore making the dovetail connections sufficient to interlock the two pieces. An end or side of the carrier may include stops to retain the slideway on the corresponding carrier.

SUMMARY OF THE INVENTION

The preferred embodiment of the present invention creates a wear face (slideway lining body) of durable plastic formed by extrusion molding. The wear face which is extruded will have intermeshing geometry such that the face can be slid onto and locked to a more rigid carrier.

In one embodiment, the present invention includes a guide for a power transmission chain comprising a carrier portion and a slide portion. The slideway portion is manufactured by an extrusion molding process and formed of a plastic material. The carrier portion may be manufactured of die cast aluminum or magnesium; injection molded nylon (plain or glass reinforced); steel stamping; steel casting; or, steel or aluminum weldment. The carrier portion and the slide portion are created with complementary profiles to allow the slide portion to be inserted and locked to the carrier portion. In this embodiment, the profile is of C-shaped cross-section and encompasses the carrier portion without a bent end or clip.

In another embodiment, the present invention includes a guide for a power transmission chain comprising a carrier and a slide portion, with the slide portion manufactured by an extrusion molding process. The carrier and slide portions are created having complementary profiles which are dovetail connections, allowing the slide portion to be inserted and locked to the carrier portion. In contrast to the prior art, these connections provide a locking fit of complementary components.

In a third embodiment, the slide portion is manufactured by extrusion molding. The carrier and slide have complementary profiles having dovetail connections and the carrier portion having a substantially I-shaped cross-section as its base. The carrier portion has an extending dovetail piece which runs along its upper surface.

In a fourth embodiment, the slide portion surface includes a pair of grooves integrally formed in the surface that contacts the carrier portion. The grooves extend along the length of the slide in the longitudinal direction.

In yet another embodiment, the present invention includes a carrier formed of a plastic, aluminum or steel material while the slide portion is formed of a nylon material.

Other objects, advantages and novel features of the present invention will become apparent from the following detailed description of the invention when considered in conjunction with the accompanying drawings.

BRIEF DESCRIPTION OF THE DRAWINGS

FIG. 1 is a cross sectional view of a slideway lining body of the present invention constructed by an extrusion molding process.

FIG. 2 is a cross sectional view of a chain guide of the present invention with an extruded slideway lining body interconnected to a carrier portion.

FIG. 3 is a cross sectional view of another embodiment of the chain guide of the present invention with an extrude slideway lining body interconnected to a carrier portion.

FIG. 4 is a side view of a guide rail of the present invention including an extruded slideway lining body and a carrier.

DETAILED DESCRIPTION OF THE PREFERRED EMBODIMENTS

Turning now to the drawings, FIG. 4 depicts a guide rail 1 that is used for guiding a chain (not shown) along its upper surface. The guide rail 1 includes a carrier portion 3 and a slideway lining body portion 5. The chain (not shown) will slide along the upper surface of the slideway lining body 5. The slideway lining body 5 is formed of a plastic or nylon material. The carrier portion 3 can be formed of aluminum, steel or injection molded nylon.

The guide rail 1 is pinned, or otherwise secured, against the engine at point 40. Thus, the pivot point 42 of the guide rail 1 is the rotation point for the guide rail. The opposite end of the guide rail 44 is left free. A tensioning device could be placed at this point to utilize the guide rail as a chain tensioner arm. Alternatively, both ends of the guide may be secured and the guide used without a tensioner.

The carrier 3 and the slideway lining body 5 are created with complementary profiles allowing the slideway lining body 5 to be inserted and locked with the carrier portion 3. The slideway lining body 5 has a top surface 30 along which the chain (not shown) will slide. The slideway lining body 5 has ends 46 and 48 which extend to the end areas 41 and 43 of the carrier. In contrast to prior art designs, the extruded slideway of the present invention provides an interlocking connection without the need for the ends of the slide portion to extend beyond the ends of the carrier and wrap around the ends of the carrier to lock the pieces. The slideway lining body 5 slides onto the carrier portion 3 having sides 17 and 27, as shown more clearly in FIG. 1, and portions 15 and 25 which extend around the sides of the carrier. Therefore, the slideway lining body has a C-shaped contour when viewed from a cross-sectional perspective (FIG. 1).

FIG. 1 depicts a preferred embodiment of the present invention, in which the slideway lining body is constructed by an extrusion molding process. The heated, fluid plastic is pressed through a profile with a cross-section matching the contour of the cross-section shown in FIG. 1, and then hardened. The slideway lining body consists of a durable plastic material which can withstand the wear and loads caused by a chain. In the alternative, the slideway lining body could be constructed of a nylon material.

The slideway lining body 5, when taken in a cross-sectional view as in FIG. 1, is constructed in the shape of a C. The slideway lining body 5 includes five sections. The body includes the top portion 10, the two side portions 17 and 27 and the two bottom portions 15 and 25. The slideway lining body 5 slides onto and locks over a complementary carrier piece 3, shown in FIG. 4. The slideway lining body 5 is formed with a profile complementary to that of the carrier portion 3. When the slideway lining body 5 is slid onto the carrier 3, the two side portions 17 and 27, and the two bottom portions 15 and 25 encompass and lock onto the carrier 3. The top of the slideway lining body 30 is positioned adjacent to the chain (not shown).

FIG. 2 depicts a cross sectional view of another embodiment of the chain guide 1 with the extruded slideway lining body 5. This embodiment of the present invention utilizes a dovetail cross-section along the top of the carrier 3 to interconnect with the complementary cross-section of the slideway lining body 5. As a result of extrusion molding of the slideway, the dovetail portion 31 locks into matching groove 20 placed on the bottom surface of the wear face 5. Two additional grooves 35 and 36 are also formed along the slide portion 5, and extend along the length of the slide portion. Grooves 35 and 36 provide a reduced cross-sectional area, which permits the straight extruded slideway to conform to the curvature in the length of the carrier.

FIG. 3 depicts a cross sectional view of another embodiment of the chain guide 1 with the extruded slideway lining body 5. This embodiment of the present invention utilizes only one dovetail section 32 to interconnect with the matching cross section of the slideway lining body 5. This dovetail connection 32 locks into groove 20 formed along the bottom of the slideway lining body.

As noted above, the use of an extrusion molding process for forming the slideway provides a matching cross section with the complementary carrier that can be formed to close tolerances. The pieces lock to one another without the need for additional clips or other locking mechanisms or meshing arrangements.

Those skilled in the art to which the invention pertains may make modifications and other embodiments employing the principles of this invention without departing from its spirit or essential characteristics, particularly upon the foregoing teachings. The described embodiments are to be considered in all respects only as illustrative and not restrictive, and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A guide for a power transmission chain, comprising:
   a carrier portion and a slide portion,
   said slide portion being formed of polymer material and being manufactured by an extrusion molding process wherein the polymer material is forced through an orifice having a predetermined profile while the material is in a molten state,
   said carrier portion and slide portion having complementary profiles to allow said slide portion to be inserted along said carrier portion and moved to a stopped position along said carrier portion, said complementary profiles acting to prevent relative movement of said carrier portion with respect to said slide portion after assembly in said stopped position.

2. The guide of claim 1 wherein said complementary profiles are dovetail shape.

3. The guide of claim 2 wherein said carrier portion has a base of substantially I-shaped cross-section with an extending piece along an upper surface, said extending piece having a dovetail shape.

4. The guide of claim 3 wherein said slide portion has a complementary dovetail cross-section along one surface and a pair of grooves along said surface to facilitate conformance of said slide portion with the curvature of said carrier portion.

5. The guide of claim 1 wherein said slide portion is formed of nylon material.

6. The guide of claim 1 wherein said carrier portion is formed of aluminum.

7. The guide of claim 1 where said slide portion is formed of plastic material.

8. A method for manufacturing a guide for a power transmission chain, said method comprising the steps of:
   forming a carrier portion of a first cross-sectional shape by injection molding of a plastic material,
   forming a slide portion of a second cross-sectional shape by extrusion of a molten polymer material through an extrusion die having an orifice of predetermined profile, said second cross-sectional shape being complementary with said first cross-sectional shape,
   inserting said carrier portion within said slide portion by placing said first cross-sectional shape of said carrier portion within said complementary cross-sectional shape of said slide portion,
   sliding said carrier portion within said slide portion until said carrier portion is moved to a locked position within said slide portion, said complementary cross-sectional shapes preventing relative movement of said carrier portion with respect to said slide portion after movement to said locked position.

9. The method of claim 8 wherein said complementary cross-sectional shapes are dovetail shape.

10. The method of claim 8 wherein said slide portion is formed of nylon material.

* * * * *